(12) United States Patent
Claussen et al.

(10) Patent No.: US 10,320,443 B2
(45) Date of Patent: Jun. 11, 2019

(54) EXTRA-CHANNEL TRANSMISSION LIMITING SWITCH

(71) Applicant: Intel IP Corporation, Santa Clara, CA (US)

(72) Inventors: Cornelius Claussen, Bad Schoenborn (DE); Markus Mack, Santa Clara, CA (US); Jens Schaub, Sankt Leon-Rot (DE)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 15/857,700

(22) Filed: Dec. 29, 2017

(65) Prior Publication Data

US 2019/0052307 A1 Feb. 14, 2019

(51) Int. Cl.
*H04B 1/715* (2011.01)
*H04B 1/7143* (2011.01)
*H04B 1/7156* (2011.01)
*H04B 1/7136* (2011.01)

(52) U.S. Cl.
CPC .......... *H04B 1/715* (2013.01); *H04B 1/7143* (2013.01); *H04B 1/7156* (2013.01); *H04B 2001/7154* (2013.01); *H04B 2001/71367* (2013.01)

(58) Field of Classification Search
CPC ..... H04B 1/715; H04B 1/7143; H04B 1/7156
See application file for complete search history.

(56) References Cited

U.S. PATENT DOCUMENTS

| | | | | |
|---|---|---|---|---|
| 4,491,973 A | * | 1/1985 | Idol | H04B 17/15 324/140 R |
| 5,507,014 A | * | 4/1996 | Wray | H03F 1/3247 455/114.3 |
| 2007/0290804 A1 | * | 12/2007 | Komesu | G06K 7/0008 340/10.1 |
| 2015/0043669 A1 | * | 2/2015 | Ella | H01Q 1/521 375/267 |
| 2018/0058945 A1 | * | 3/2018 | Vesnin | G01K 11/006 |

* cited by examiner

*Primary Examiner* — Jaison Joseph
(74) *Attorney, Agent, or Firm* — Viering, Jentschura & Partner MBB

(57) ABSTRACT

A signal transmission system comprising a power amplifier, configured to amplify a signal; an antenna port, controllably connectable by a switch in series to an output of the power amplifier, and configured to be coupled to an antenna; a load component, controllably connectable by the switch in series to the output of the power amplifier; wherein the switch is disposed between the power amplifier and the antenna port and the load, to selectively connect the load component or the antenna port to the power amplifier according to a first operational mode and a second operational mode, and wherein the first operational mode is a mode in which the power amplifier is electrically connected to the antenna port and disconnected from the load component, and the second operational mode is a mode in which the power amplifier is electrically connected to the load component and disconnected from the antenna port.

16 Claims, 7 Drawing Sheets

EXTRA-CHANNEL TRANSMISSION LIMITING SWITCH

TECHNICAL FIELD

Various aspects of the disclosure relate generally to limitation of extra-channel transmissions during channel hopping.

BACKGROUND

"Channel hopping" is a type of a wireless transmission scheme that is characterized by a series of randomly or pseudo-randomly selected channels within a given bandwidth. Sequential channels may not be adjacent; rather, there may be a significant frequency difference between sequential channels, and therefore a power amplifier should modulate to accommodate the channel differences. Modulation may not be instantaneous, and the modulation transition may cause noise to be transmitted during the modulation between a first channel and a second channel. This may be detrimental to the channel hopping system.

SUMMARY

Herein is disclosed a signal transmission system comprising a power amplifier, configured to amplify a signal; an antenna port, controllably connectable by a switch in series to an output of the power amplifier, and configured to be coupled to an antenna; a load component, controllably connectable by the switch in series to the output of the power amplifier; wherein the switch is disposed between the power amplifier and the antenna port and the load, to selectively connect the load component or the antenna port to the power amplifier according to a first operational mode and a second operational mode, and wherein the first operational mode is a mode in which the power amplifier is electrically connected to the antenna port and disconnected from the load component, and the second operational mode is a mode in which the power amplifier is electrically connected to the load component and disconnected from the antenna port.

BRIEF DESCRIPTION OF THE DRAWINGS

Throughout the drawings, it should be noted that like reference numbers are used to depict the same or similar elements, features, and structures. The drawings are not necessarily to scale, emphasis instead generally being placed upon illustrating aspects of the disclosure. In the following description, some aspects of the disclosure are described with reference to the following drawings, in which.

DESCRIPTION

Figure 1:
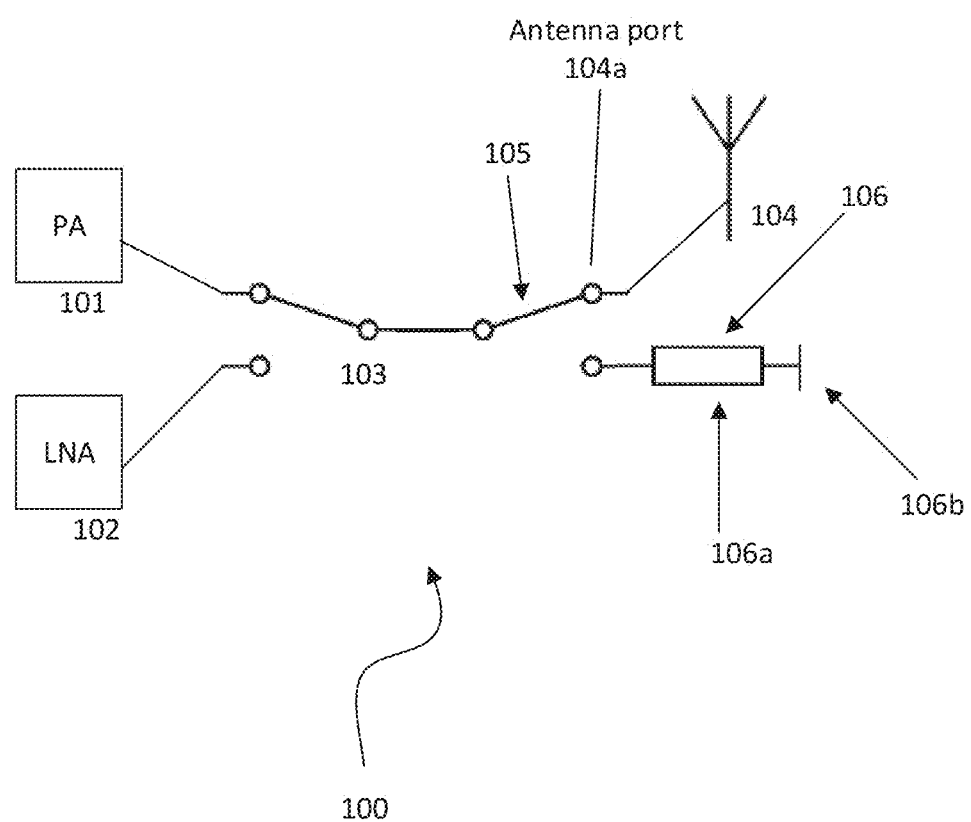
FIG. 1 shows an extra-channel transmission limitation system according to one aspect of the disclosure.

The following detailed description refers to the accompanying drawings that show, by way of illustration, specific details and aspects in which the disclosure may be practiced. These aspects are described in sufficient detail to enable those skilled in the art to practice the disclosure. Other aspects may be utilized and structural, logical, and electrical changes may be made without departing from the scope of the disclosure. The various aspects are not necessarily mutually exclusive, as some aspects can be combined with one or more other aspects to form new aspects. Various aspects are described in connection with methods and various aspects are described in connection with devices. However, it may be understood that aspects described in connection with methods may similarly apply to the devices, and vice versa.

The word "exemplary" is used herein to mean "serving as an example, instance, or illustration." Any example or design described herein as "exemplary" is not necessarily to be construed as preferred or advantageous over other examples or designs.

Throughout the drawings, it should be noted that like reference numbers are used to depict the same or similar elements, features, and structures.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of listed elements.

The words "plural" and "multiple" in the description and the claims expressly refer to a quantity greater than one. Accordingly, any phrases explicitly invoking the aforementioned words (e.g. "a plurality of [objects]", "multiple [objects]") referring to a quantity of objects expressly refers more than one of the said objects. The terms "group (of)", "set [of]", "collection (of)", "series (of)", "sequence (of)", "grouping (of)", etc., and the like in the description and in the claims, if any, refer to a quantity equal to or greater than one, i.e. one or more. The terms "proper subset", "reduced subset", and "lesser subset" refer to a subset of a set that is not equal to the set, i.e. a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term data, however, is not limited to the aforementioned examples and may take various forms and represent any information as understood in the art.

The term "processor" or "controller" as, for example, used herein may be understood as any kind of entity that allows handling data, signals, etc. The data, signals, etc. may be handled according to one or more specific functions executed by the processor or controller.

A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term "system" (e.g., a drive system, a position detection system, etc.) detailed herein may be understood as a set of interacting elements, the elements may be, by way of example and not of limitation, one or more mechanical components, one or more electrical components, one or more instructions (e.g., encoded in storage media), one or more controllers, etc.

A "circuit" as user herein is understood as any kind of logic-implementing entity, which may include special-purpose hardware or a processor executing software. A circuit may thus be an analog circuit, digital circuit, mixed-signal circuit, logic circuit, processor, microprocessor, Central Processing Unit ("CPU"), Graphics Processing Unit ("GPU"), Digital Signal Processor ("DSP"), Field Programmable Gate Array ("FPGA"), integrated circuit, Application Specific Integrated Circuit ("ASIC"), etc., or any combination thereof. Any other kind of implementation of the respective functions which will be described below in further detail may also be understood as a "circuit." It is understood that any two (or more) of the circuits detailed herein may be realized as a single circuit with substantially equivalent functionality, and conversely that any single circuit detailed herein may be realized as two (or more) separate circuits with substantially equivalent functionality. Additionally, references to a "circuit" may refer to two or more circuits that collectively form a single circuit.

As used herein, "memory" may be understood as a non-transitory computer-readable medium in which data or information can be stored for retrieval. References to "memory" included herein may thus be understood as referring to volatile or non-volatile memory, including random access memory ("RAM"), read-only memory ("ROM"), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component including one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

Various wireless communications protocols may require transmission to occur along a random or pseudorandom series of transmission channels. One such method of wireless communication is known as "channel hopping," which may also be known as time slotted channel hopping, frequency hopping, direct sequence spread spectrum, frequency hopping spread spectrum, or spread spectrum system. For simplicity, any such system involving transmitting while frequently changing between channels within a bandwidth will be referred to herein as "channel hopping". Because these methods will be understood by a person skilled in the art, the intricacies and regulations of said systems will not be described in great detail herein. It is noted, however, that a common characteristic among these systems may be relatively brief transmissions that are caused to change or "hop" from one channel to another at regular intervals. Such systems may be commonly used within shared bandwidth. The rapid switching from one channel to another improves functionality with multiple users in a shared bandwidth situation.

Channel hopping may be regulated by one or more regulatory bodies. Such regulations may include a maximum length of time during which a transmission can occur on a particular channel. Other regulations may include maximum noise created while transitioning between channels. Where transmission noise is created during switching between channels, this may have negative consequences on the usability of the spectrum. This may be particularly true where multiple users simultaneously attempt to use a given bandwidth, and wherein the multiple users permit noise to leak into neighboring frequencies during transitions between channels.

FIG. 1 depicts a signal transmission system 100 according to an aspect of the disclosure. The signal transmission system may include a baseband modem (not shown in FIG. 1), configured to generate a signal for wire transmission. The signal created by the baseband modem must be amplified in preparation for wireless transmission. The baseband modem's signal is transmitted to a power amplifier 101, which is configured to amplify the signal in preparation for wireless transmission. The wireless transmission system may also include a low noise amplifier 102, which is configured to amplify a low noise signal from an antenna. Although the low noise amplifier 102 is depicted in FIG. 1 for demonstrative purposes, the principles described herein are not dependent on the presence of a low noise amplifier, and therefore the low noise amplifier 102 should not be understood as being a necessary portion of the disclosure. Where a low noise amplifier 102 is present, an amplification switch 103 may be used to switch the system between the power amplifier 101 and the low noise amplifier 102. Where the low noise amplifier 102 is absent, the amplification switch 103 may similarly be absent, and therefore the amplification switch 103 should not be understood to be a necessary portion of the principles described herein. For the remaining principles described herein, it will be assumed that the amplification switch 103 is configured to create an electrical connection to the power amplifier 101, as depicted in FIG. 1. An antenna port 104a is controllably connectable by a switch in series to the power amplifier and configured to be connected to an antenna. An antenna 104 is disposed along a serial connection to the power amplifier 101 via the antenna port and is configured to wirelessly transmit amplified signals from the power amplifier 101. Disposed between the power amplifier and the antenna is a switch 105, including a first terminal and a second terminal, which may be configured to open or close according to the principles and methods described herein. The antenna port 104a is connected to the first terminal of the switch 105, such that, when the switch is connected to the first terminal, the power amplifier 101 is electrically connected in serial to the antenna port 104*a*. A load component 106 is disposed on the second terminal of the switch 105 such that, when the switch 105 is connected to the second terminal, the power amplifier 101 is no longer connected to the antenna 104, and is instead connected in series to the load component 106. The load component 106 may include a resistor 106*a* and a ground 106*b*. The resistor 106*a* may be configured to provide any amount of resistance desirable for the given implementation, without limitation. According to one aspect of the disclosure, the resistor 106*a* may be configured to provide 50 ohms of resistance. According to another aspect of the disclosure, the resistance of the load may be configured to based on a signal output of the power amplifier.

The switch 105 may be configured to alternate between a first operational mode and a second operational mode. In the first operational mode, the switch 105 is connected to a first terminal (as depicted in FIG. 1). In the first operational mode, and amplified signal travels from the power amplifier 101 into the antenna 104, where the amplified signal is wirelessly transmitted. In the second operational mode, the switch 105 is connected to the second terminal, thereby disconnecting the power amplifier 101 from the antenna 104 and electrically connecting the power amplifier 101 to the load component 106. In this manner, the second operational mode redirects the amplified signal from the power amplifier into the load component, and thereby diverts the amplified signal from the antenna 104. In this manner, switching from the first operational mode to the second operational mode diverts the amplified signal from the antenna 104 and thereby prevents a wireless transmission from the antenna 104.

Figure 2:
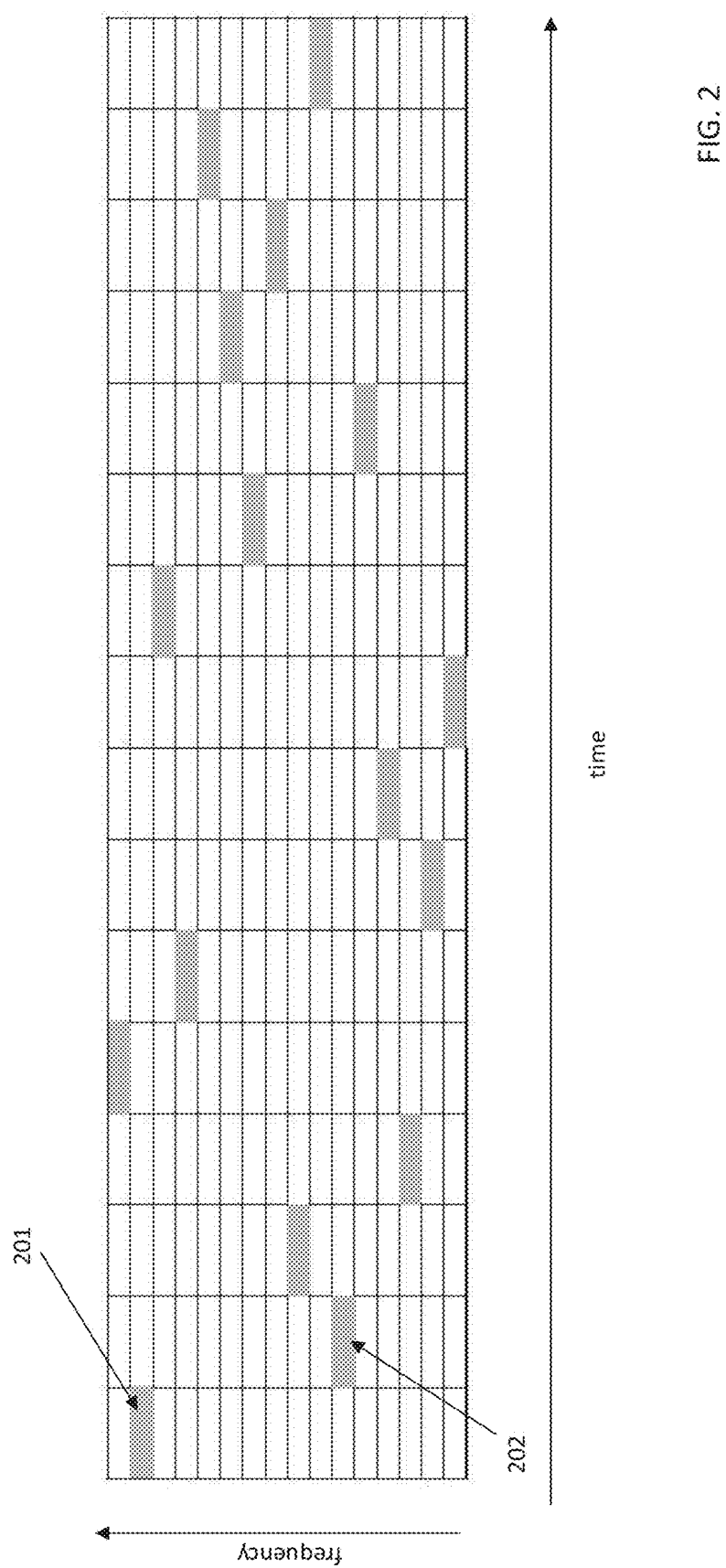
FIG. 2 depicts a sequence of transmissions in a channel hopping scheme.

FIG. 2 shows a frequency hopping transmission scheme according to another aspect of the disclosure. In this figure, a set of channel hopping transitions is depicted herein, wherein the x-axis depicts time, and the y-axis depicts frequency. This figure depicts a 16×16 map, wherein sixteen sequential transmissions are depicted among sixteen potential frequencies within a bandwidth. The number of available frequencies will be dictated at least by the size of the bandwidth, and nothing in this disclosure should be understood to be limiting of the number of available frequencies. In this case, the transmissions may be of uniform length, as depicted herein, although uniform length should not be understood to be necessary. Shaded regions represent a time and frequency of transmission, and non-shaded regions indicate that no transmission is occurring by the given transmission system (although other systems using the shared bandwidth may in fact be transmitting in the non-shaded regions). The transmission begins with a first transmission block at a first frequency 201, immediately followed by a second transmission block at a second frequency 202. Each transmission interval occurs at a randomly selected or pseudo-randomly selected frequency. In order to achieve transmission between frequencies, the power amplifier must modulate up or down to emit an amplified signal at the desired frequency range.

Figure 3:
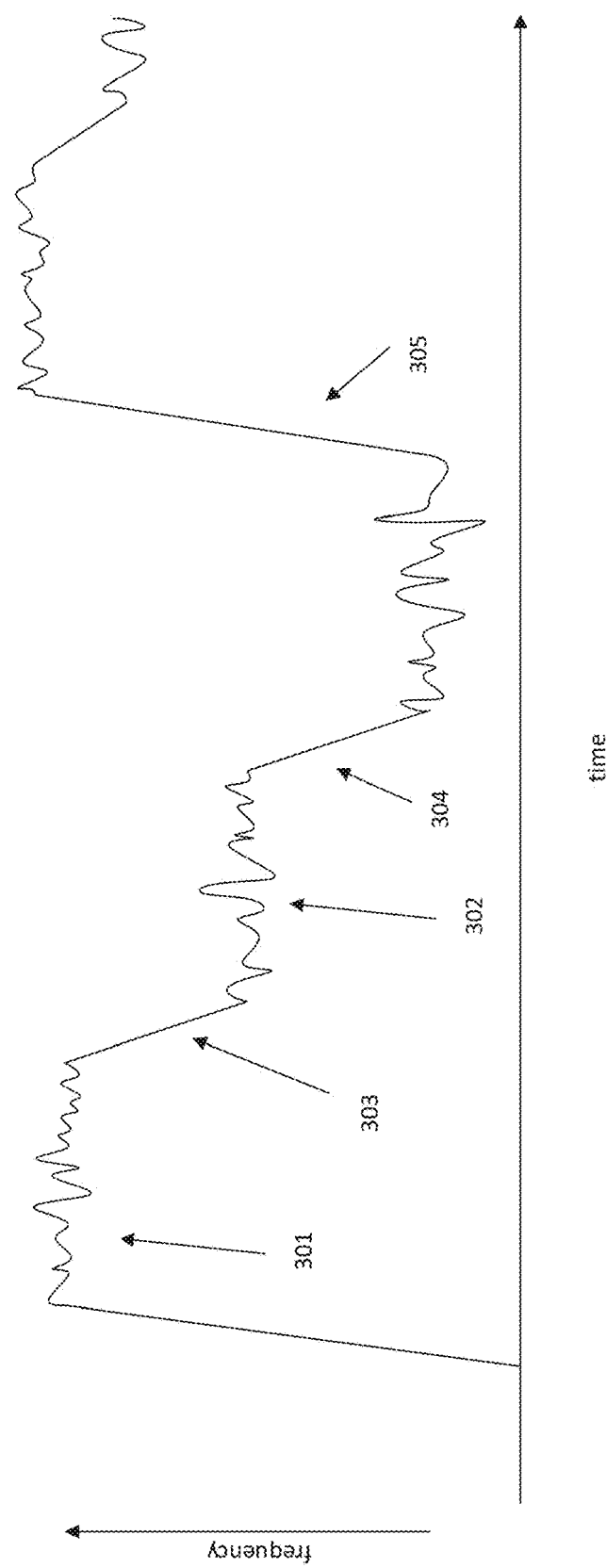
FIG. 3 depicts transmission blocks in varying channels with accompanying modulations according to a channel hopping scheme.

FIG. 3 shows a channel hopping transmission series with respect to the upward or downward modulation of the power amplifier. In this case, the series of transmissions at random or pseudo-random channels are depicted as principally horizontal regions, during which the transmission occurs, such as region 301 and region 302. In between transmissions, the power amplifier must modulate or adjust to transmit within the next channel in the random or pseudo-random series. This modulation does not occur instantaneously, and therefore the power amplifier may cause brief transmission or noise within the frequencies between a first transmission block and a second transition block. As depicted herein, after the transmission of the first transmission block 301 is complete, the power amplifier must transition to the second transmission block 302. The transitional period is depicted as a descending line in 303. During the period of 303, the power amplifier and antenna may transmit noise at frequencies between the first transmission block 301 and the second transmission block 302. This may occur during transmission between any two frequency blocks, such as depicted by 304 and 305. Any transmissions that occur during a modulation period may be regarded as noise and may contribute to an overall detriment of the broadband spectrum and/or the frequency hopping scheme. Moreover, regulations may be in place limiting an amount of transmission during transitions between transmission blocks.

Figure 4:
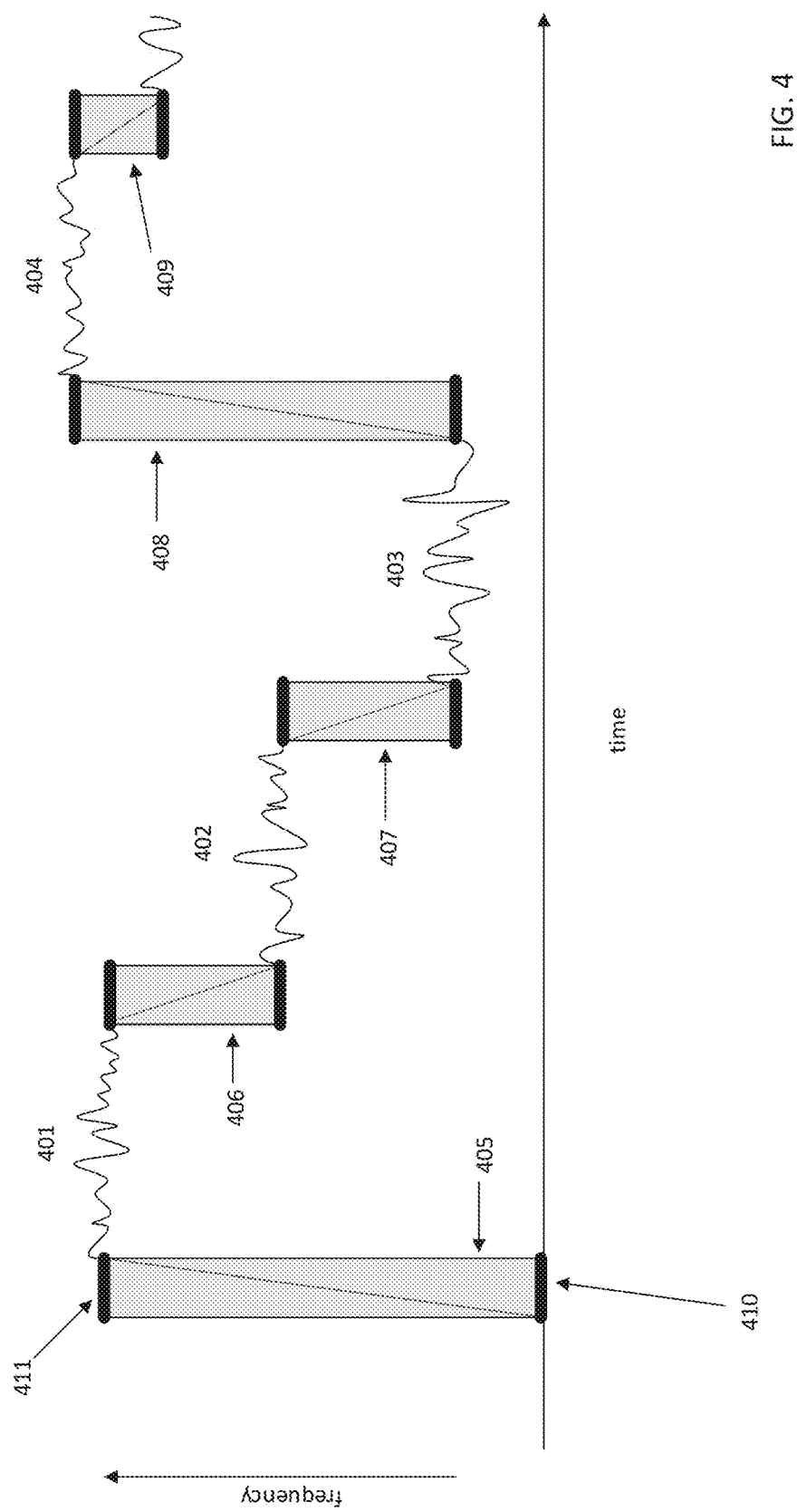
FIG. 4 depicts a first operational mode during modulation according to a percent of modulation complete.

FIG. 4 shows the switching between operational modes pursuant to a percentage of modulation by the power amplifier 101. It is known, based on the random or pseudo-random channel transmission code, in which channel a given transmission should occur. Using this information, the power amplifier modulates upward or downward to transmit at the next frequency. Thus, where a transmission at a given channel occurs, the power amplifier modulation level for the given channel is known, as is the power amplifier modulation level for the next channel. The switch may be configured to change between operational modes based on a percentage of modulation power reached, as shown in FIG. 4.

In this figure, a set of transmissions pursuant to a channel hopping scheme is shown. Four transmission blocks 401-404 are depicted as occurring sequentially at differing channels. Modulation periods 405-409 depict the power amplifier modulation from one channel to a next channel. In this manner, the power amplifier modulates during the first transition 405 from a power-off state to a state for the first transmission block 401. Upon completion of the first transmission block 401, the power amplifier modulates during the second transition 406 from a state for the first transmission block 401 to a state for the second transmission block 402. Upon completion of the second transmission block 402 the power amplifier modulates during the third transmission 407 from a state for the first transmission block 402 to the third transmission block 403. Upon completion of the third transmission block 403, the power amplifier modulates during the fourth transition 408 from a state for the third transmission 403 to a state for the fourth transmission 404. Upon completion of the fourth transmission block 404, the power amplifier modulates during a fifth transition 409. Each transition period 405-409 has a known starting modulation point and ending modulation point, as depicted herein by a thick black band. In this manner, the first transition 405 has a starting modulation point 410 and ending modulation point 411.

Where the starting modulation point 410 in the ending modulation point 411 are known, the switch can be configured to change between operational modes based on a percentage of modulation completed. That is to say, the switch could be configured to enter the second operational mode after completing a first percentage of the modulation, and the switch can be configured to enter the first operational mode after completing a second percentage of the modulation. The first percentage and second percentage may be configured with any percentages as desired according to the implementation. According to one aspect of the disclosure, the first percentage may occur at 20% of the modulation, and the second percentage may occur at 80% of the modulation. According to another aspect of the disclosure, the first percentage maker 10% of the modulation, and the second percentage may occur at 90% of the modulation.

Figure 5:
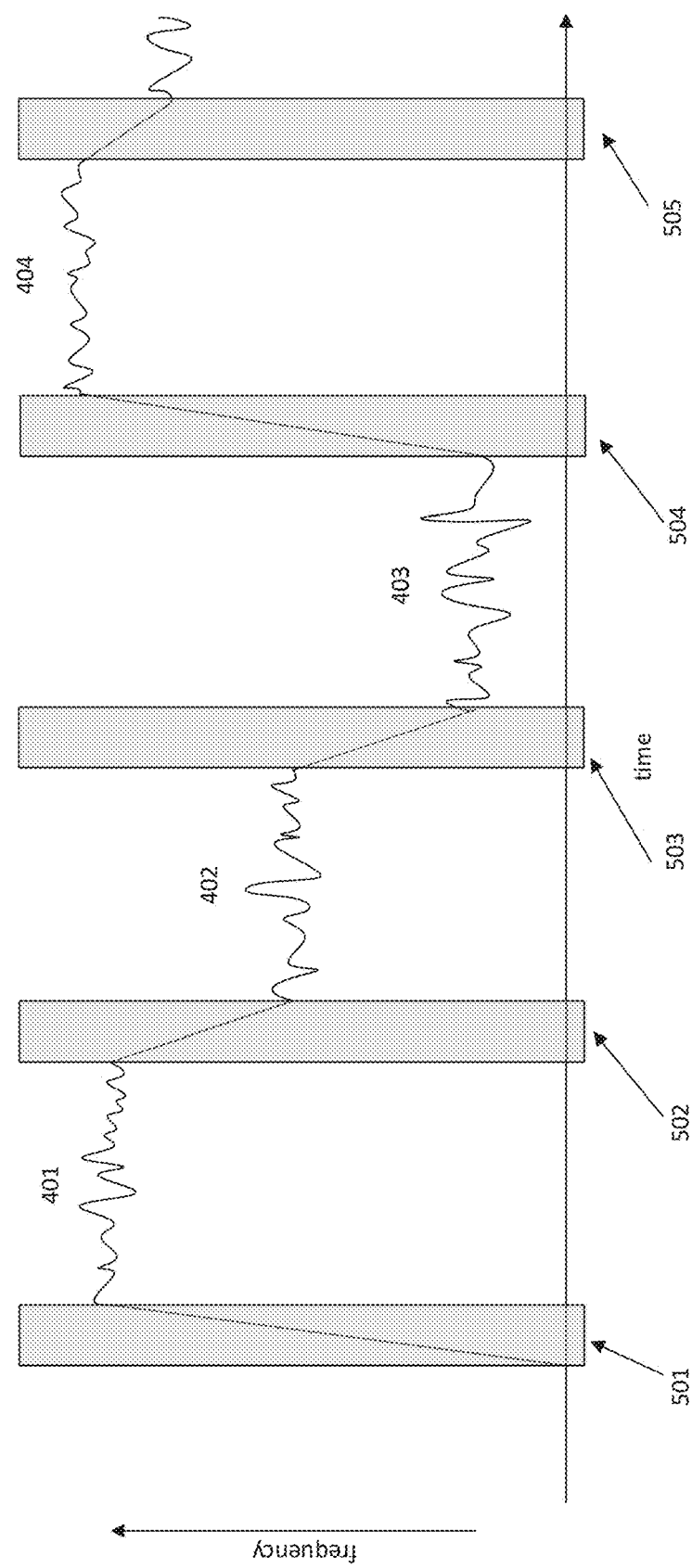
FIG. 5 depicts a first operational mode during modulation according to a timing.

FIG. 5 shows an alternative configuration of selecting an operational phase based on a timing of a modulation. In a channel hopping system, transmissions may be regularly timed such that the starting time and/or ending time of a transmission may be known. In this figure, for transmission blocks 401-404 are depicted between five transitions (modulations) 501-505. Each of the five transitions depicts the power amplifier modulating from a first state to a second state, such that the power amplifier may transmit in a given channel immediately thereafter. Where the transmission timings in a channel hopping scheme are known, and therefore the transition timings are similarly known, timing may be used as a substitute for percentage of power amplifier modulation. Thus, where the timings of the transitions 501-505 are known, or may be derived, the switch may be configured to change between the first operational mode and the second operational mode based on one or more timings of the transitions. In this manner, the switch may be configured to change from the first operational mode to the second operational mode at the beginning of transitions 501-505, and to change from the second operational mode to the first operational mode at the conclusion of transitions 501-505. The timing of the change of operational mode within a transition may be adjusted such that the operational mode changes upon the beginning and/or end of the transition, or upon a percentage of the transition, such that the second operational mode is entered after a first percentage of the transition is complete and the first operational mode is entered after a second percentage of the transition is complete. According to one aspect of the disclosure, the first percentage may be 10%, and the second percentage may be 90%. According to another aspect of the disclosure, the first percentage may be 20%, and the second percentage may be 80%. The specific percentages may be adjusted depending on the desired implementation, and nothing in these examples should be understood as limiting the percentage to a particular value.

Figure 6:
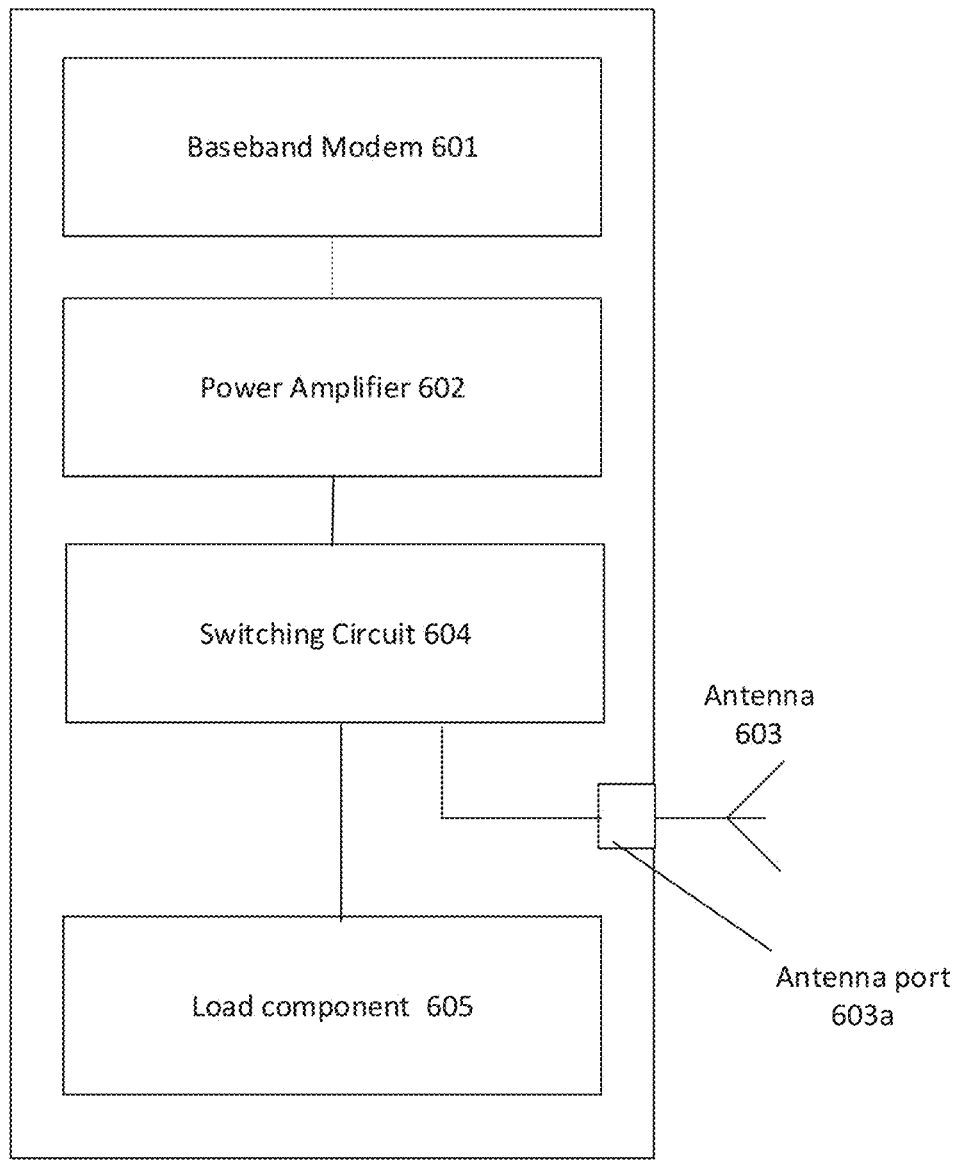
FIG. 6 shows a signal transmission system according to another aspect of the disclosure.

FIG. 6 shows a signal transmission system including a baseband modem 601, configured to generate a signal for wireless transmission; a power amplifier 602, configured to amplify a signal; an antenna port, controllably connectable by a switch in series to an output of the power amplifier, and configured to be coupled to an antenna 603; a load component 605 controllably connectable by the switch in series to the output of the power amplifier; the switch, disposed between the power amplifier 602 and the antenna port 603a and the load 605, to selectively connect the load component or the antenna port 603a to the power amplifier 602 according to a first operational mode and a second operational mode, wherein the first operational mode is a mode in which the power amplifier 602 is electrically connected to the antenna port and disconnected from the load component, and the second operational mode is a mode in which the power amplifier 602 is electrically connected to the load component and disconnected from the antenna port.

The load component 605 may further include a resistor. The resistor may be configured to provide any amount of resistance desired for a given implementation. According to one aspect of the disclosure, the resistor may be configured to provide 50 ohms of resistance. The amount of resistance may be chosen at least to limit the power traveling from the PA.

The load component 605 may further include a ground connection. The ground connection may be a true earth connection, or be any other voltage differential configured to cause power to travel to the load component.

The switching circuit 604 is configured to switch between a first operational mode and a second operational mode. The switching circuit may further include one or more processors configured to cause the switch to open or close and therefore effectuate the first operational mode and the second operational mode. The first operational mode may be described as a mode in which the switch is open, and thereby interrupting an electrical connection between the power amplifier and the load component. In the first operational mode, the power amplifier is not electrically connected to the load component, and the output of the power amplifier is caused to travel at least to the antenna for wireless transmission of the amplified signal. In the second operational mode, the switch is closed and thereby establishes an electrical connection between the power amplifier and the load component. When electrical connection between the power amplifier and the load component is established, power is drawn from the power amplifier to the load component. Power is drawn away from the antenna, such that the second operational mode eliminates or diminishes a signal strength emitted from the antenna.

Figure 7:
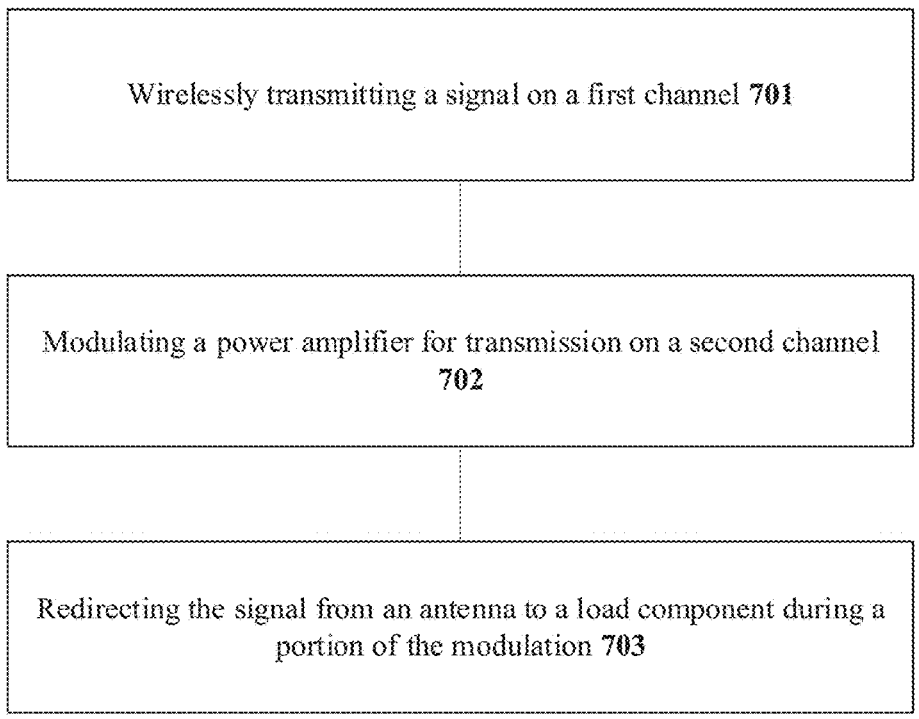
FIG. 7 shows a method for signal transmission according to an aspect of the disclosure.

FIG. 7 shows a method for signal transmission comprising wirelessly transmitting a signal on a first channel 701; modulating a power amplifier for transmission on a second channel 702; and redirecting the signal from an antenna to a load component during a portion of the modulation 703.

Transition between the first operational mode and the second operational mode may be triggered by one or more power thresholds of the power amplifier. Because the channels for transmission are known, the modulation of the power amplifier from a state for a first channel to a state for the second channel is also known, and a percentage of the modulation completed may be selected as a trigger to transition between operational states. In this manner, the operational mode may be changed from the second operational mode to the first operational mode upon the completion of the transmission and/or the beginning of a transition, and the operational mode may be changed from the first operational mode to the second operational mode upon the completion of the transition and/or beginning of the transmission. Alternatively, the percentage of modulation completed may be selected such that the transition from the second operational mode to the first operational mode occurs after a first percentage of the transition has completed, and a transition from the first operational mode to the second operational mode occurs after a second percentage of the transition has completed. According to one aspect of the disclosure, the first percentage is 10%, and the second percentage is 90%. According to another aspect of the disclosure, the first percentages 20%, and the second percentage is 80%. In selecting percentages that cause the transition between operational modes to occur after the transition has begun and again before the transition ends, a buffer is created in which a tolerance for transition between operational modes is established, such that operational modes may be changed with reduced risk of transmission failure. That is to say, where the system attempts a transmission while still within the second operational mode, the transmission will fail. Choosing a first percentage and a second percentage other than 0% and 100% permit increased flexibility in a buffer zone to reduce the risk of failed transmission, if desired.

The signal transmission system may be configured to switch between operational modes based on a timing of the transmission, rather than a percentage of modulation complete. Depending on the configuration, it may be difficult or undesirable to measure a percentage of modulation complete, and therefore it may be desired to use a timing to cause the transition between operational modes to occur in periods corresponding to percentages of modulation completed. In this manner, a duration for a transition period may be selected, and the system may be configured to enter the first operational mode for a length of time equal to or less than the duration for the transition period. This transition between operational modes may be triggered to occur at a frequency corresponding to a length of transmission. For example, where a transmission is limited to 0.4 seconds, the transition period may be configured to occur every 0.4 seconds. Similarly, transition from the second operational mode to the first operational mode may occur every 0.4 seconds, and transition from the first operational mode to the second operational mode may occur every 0.4 seconds at a predetermined interval thereafter. The predetermined interval may be any length of time as selected for the implementation. According to one aspect of the disclosure, the predetermined interval may be 5 ms.

The signal transmission system may further include one or more processors, which are configured to control the changes between the first operational mode and the second operational mode. This may involve controlling the switch to open or close in accordance with the methods and principles described herein. The one or more processors may be disposed within a switching circuit or otherwise. The one or more processors may be configured to determine a timing for switching between operational modes based on a frequency hopping scheme and/or a frequency or timing of transmission blocks.

The switch may be a physical switch, a transistor, a field effect transistor, a MOSFET, a logic elements, a circuit, or any other system that permits switching between the first operational mode and the second operational mode.

The system may further include a baseband modem, which is configured to generate the signal to be amplified and later wirelessly transmitted. The baseband modem may be any kind of baseband modem capable of creating a signal for wireless transmission. According to one aspect of the disclosure, the baseband modem may be a 2.45 GHz modem.

In the following, various examples are provided with reference to the aspects described above.

In Example 1, a signal transmission system is disclosed comprising a power amplifier, configured to amplify a signal; an antenna port, controllably connectable by a switch in series to an output of the power amplifier, and configured to be coupled to an antenna; a load component controllably connectable by the switch in series to the output of the power amplifier; wherein the switch is disposed between the power amplifier and the antenna port and the load, to selectively connect the load component or the antenna port to the power amplifier according to a first operational mode and a second operational mode, and wherein the first operational mode is a mode in which the power amplifier is electrically connected to the antenna port and disconnected from the load component, and the second operational mode is a mode in which the power amplifier is electrically connected to the load component and disconnected from the antenna port.

In Example 2, the signal transmission system of Example 1 is disclosed, further comprising an antenna connected to the antenna port and configured to wirelessly transmit the amplified signal.

In Example 3, the signal transmission system of any one of Examples 1 or 2 is disclosed, wherein the signal is transmitted at a first frequency during a first transmission period and at a second frequency during a second transmission period, and wherein the power amplifier is further configured to modulate from the first frequency to the second frequency.

In Example 4, the signal transmission system of Example 3 is disclosed, wherein the switch connects the load component to the power amplifier during a first portion of the power amplifier modulation, and wherein the switch disconnects the load component from the power amplifier during a second portion of the power amplifier modulation.

In Example 5, the signal transmission system of Examples 3 or 4 is disclosed, wherein the switch is configured to redirect the amplified signal to the load component during at least a portion of the power amplifier modulation.

In Example 6, the signal transmission system of any one of Examples 1 to 5 is disclosed, wherein the load component comprises a resistor, configured to receive at least a portion of the amplified signal.

In Example 7, the signal transmission system of Example 6 is disclosed, wherein the resistor has a resistance of about 50 Ohms.

In Example 8, the signal transmission system of any one of Examples 1 to 7 is disclosed, wherein the first operational mode directs the amplified signal to the antenna port.

In Example 9, the signal transmission system of any one of Examples 1 to 8 is disclosed, wherein the second operational mode directs the amplified signal to the load component.

In Example 10, the signal transmission system of any one of Examples 1 to 9, wherein the switch is configured to connect the load component to the power amplifier according to the second operational mode when the power amplifier reaches a first predetermined power threshold.

In Example 11, the signal transmission system of Example 10 is disclosed, wherein the first predetermined power threshold is a percentage of power.

In Example 12, the signal transmission system of Example 10 is disclosed, wherein the first predetermined power threshold is a percentage of a channel modulation completed.

In Example 13, the signal transmission system of any one of Examples 1 to 12 is disclosed, wherein the switch is configured to disconnect the load component from the power amplifier according to the first operational mode when the power amplifier reaches a second predetermined power threshold.

In Example 14, the signal transmission system of Example 13 is disclosed, wherein the second predetermined power threshold is a percentage of power.

In Example 15, the signal transmission system of Example 13 is disclosed, wherein the second predetermined power threshold is a percentage of a channel modulation completed.

In Example 16, the signal transmission system of any one of Examples 1 to 9 is disclosed, wherein the switch is configured to switch between the first operational mode and the second operational mode according to a transition timing.

In Example 17, the signal transmission system of Example 16 is disclosed, wherein the power amplifier is configured to transition from a first transmission frequency to a second transmission frequency.

In Example 18, the signal transmission system of Example 17 is disclosed, wherein the switch is configured to change from the first operational mode to the second operational mode during the transition.

In Example 19, the signal transmission system of Example 17 is disclosed, wherein the switch is configured to change from the second operational mode to the first operational mode during the transition.

In Example 20, the signal transmission system of Example 17 is disclosed, wherein the switch is configured to change from the first operational mode to the second operational mode, and then from the second operational mode to the first operational mode, during the transition.

In Example 21, the signal transmission system of any of Examples 1 to 20 is disclosed, further comprising one or more processors, configured to control the switch to switch between the first operational mode and the second operational mode.

In Example 22, the signal transmission system of any of Examples 1 to 21 is disclosed, further comprising a baseband modem, configured to generate a signal for wireless transmission.

In Example 23, the signal transmission system of Example 22 is disclosed, wherein the modem is a 2.45 GHz modem.

In Example 24, a method for signal transmission is disclosed, comprising wirelessly transmitting a signal on a first channel; modulating a power amplifier for transmission on a second channel; redirecting the signal from an antenna to a load component during a portion of the modulation.

In Example 25, the method for signal transmission of Example 24 is disclosed, wherein the load component comprises a resistor, configured to receive the signal.

In Example 26, the method for signal transmission of Example 25 is disclosed, wherein the resistor has a resistance of about 50 Ohms.

In Example 27, the method for signal transmission of any one of Examples 24 to 26 is disclosed, wherein the redirection occurs by selectively disconnecting a power amplifier from an antenna and selectively connecting the power amplifier to the load component.

In Example 28, the method for signal transmission of Example 27 is disclosed, further comprising redirecting the signal when the power amplifier reaches a first predetermined power threshold.

In Example 29, the method for signal transmission of Example 28 is disclosed, wherein the first predetermined power threshold is a percentage of power.

In Example 30, the method for signal transmission of Example 28 is disclosed, wherein the first predetermined power threshold is a percentage a channel modulation completed.

In Example 31, the method for signal transmission of any one of Examples 24 to 30 is disclosed, further comprising ceasing the redirection of signal when the power amplifier reaches a second predetermined power threshold.

In Example 32, the method for signal transmission of Example 31 is disclosed, wherein the second predetermined power threshold is a percentage of power.

In Example 33, the method for signal transmission of Example 31 is disclosed, wherein the second predetermined power threshold is a percentage of a channel modulation completed.

In Example 34, the method for signal transmission of any one of Examples 24 to 33 is disclosed, further comprising redirecting the signal according to a transition timing.

In Example 35, the method for signal transmission of Example 34 is disclosed, further comprising beginning the redirection of signal and discontinuing the redirection of signal during the transition.

In Example 36, a means for signal transmission is disclosed comprising a power amplification means, configured to amplify a signal; an antenna connection means, controllably connectable by a switching means in series to an output of the power amplification means, and configured to be coupled to an antenna; a load component controllably connectable by a switching means in series to the output of the power amplification means; wherein the switching means is disposed between the power amplification means and the antenna connection means and the load, to selectively connect the load component or the antenna connection means to the power amplification means according to a first operational mode and a second operational mode, and wherein the first operational mode is a mode in which the power amplification means is electrically connected to the antenna connection means and disconnected from the load component, and the second operational mode is a mode in which the power amplification means is electrically connected to the load component and disconnected from the antenna connection means.

In Example 37, the means for signal transmission of Example 36 is disclosed, further comprising an antenna connected to the antenna connection means and configured to wirelessly transmit the amplified signal.

In Example 38, the means for signal transmission of any one of Examples 36 or 37 is disclosed, wherein the signal is transmitted at a first frequency during a first transmission period and at a second frequency during a second transmission period, and wherein the power amplification means is further configured to modulate from the first frequency to the second frequency.

In Example 39, the means for signal transmission of Example 38 is disclosed, wherein the switching means connects the load component to the power amplification means during a first portion of the power amplification means modulation, and wherein the switching means disconnects the load component from the power amplification means during a second portion of the power amplification means modulation.

In Example 40, the means for signal transmission of Examples 38 or 39 is disclosed, wherein the switching means is configured to redirect the amplified signal to the load component during at least a portion of the power amplification means modulation.

In Example 41, the means for signal transmission of any one of Examples 36 to 40 is disclosed, wherein the load component comprises a resistor, configured to receive at least a portion of the amplified signal.

In Example 42, the means for signal transmission of Example 40 is disclosed, wherein the resistor has a resistance of about 50 Ohms.

In Example 43, the means for signal transmission of any one of Examples 36 to 42 is disclosed, wherein the first operational mode directs the amplified signal to the antenna connection means.

In Example 44, the means for signal transmission of any one of Examples 36 to 43 is disclosed, wherein the second operational mode directs the amplified signal to the load component.

In Example 45, the means for signal transmission of any one of Examples 36 to 44 is disclosed, wherein the switching means is configured to connect the load component to the power amplification means according to the second operational mode when the power amplification means reaches a first predetermined power threshold.

In Example 46, the means for signal transmission of Example 45 is disclosed, wherein the first predetermined power threshold is a percentage of power.

In Example 47, the means for signal transmission of Example 45 is disclosed, wherein the first predetermined power threshold is a percentage of a channel modulation completed.

In Example 48, the means for signal transmission of any one of Examples 36 to 47 is disclosed, wherein the switching means is configured to disconnect the load component from the power amplification means according to the first operational mode when the power amplification means reaches a second predetermined power threshold.

In Example 49, the means for signal transmission of Example 48 is disclosed, wherein the second predetermined power threshold is a percentage of power.

In Example 50, the means for signal transmission of Example 48 is disclosed, wherein the second predetermined power threshold is a percentage of a channel modulation completed.

In Example 51, the means for signal transmission of any one of Examples 36 to 44 is disclosed, wherein the switching means is configured to switching means between the first operational mode and the second operational mode according to a transition timing.

In Example 52, the means for signal transmission of Example 51 is disclosed, wherein the power amplification means is configured to transition from a first transmission frequency to a second transmission frequency.

In Example 53, the means for signal transmission of Example 52 is disclosed, wherein the switching means is configured to change from the first operational mode to the second operational mode during the transition.

In Example 54, the means for signal transmission of Example 52 is disclosed, wherein the switching means is configured to change from the second operational mode to the first operational mode during the transition.

In Example 55, the means for signal transmission of Example 52 is disclosed, wherein the switching means is configured to change from the first operational mode to the second operational mode, and then from the second operational mode to the first operational mode, during the transition.

In Example 56, the means for signal transmission of any of Examples 36 to 55 is disclosed, further comprising one or more processing means, configured to control the switching means to switching means between the first operational mode and the second operational mode.

In Example 57, the means for signal transmission of any of Examples 36 to 56 is disclosed, further comprising a baseband modem, configured to generate a signal for wireless transmission.

In Example 58, the means for signal transmission of Example 57 is disclosed, wherein the modem is a 2.45 GHz modem.

In Example 59, the means for signal transmission of Example 57 is disclosed, wherein the modem is a 2.45 GHz modem.

In Example 59, the signal transmission system of any of Examples 1 to 23 is disclosed, wherein a resistance of the load is selected to match the signal output of the power amplifier.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes, which come within the meaning and range of equivalency of the claims, are therefore intended to be embraced.

What is claimed is:

1. A signal transmission system comprising:
    a power amplifier, configured to amplify a signal;
    an antenna port, controllably connectable by a switch in series to an output of the power amplifier, and configured to be coupled to an antenna;
    a load component, controllably connectable by the switch in series to the output of the power amplifier;
    wherein the switch is disposed between the power amplifier and the antenna port and the load, to selectively connect the load component or the antenna port to the power amplifier according to a first operational mode and a second operational mode, and wherein the first operational mode is a mode in which the power amplifier is electrically connected to the antenna port and disconnected from the load component, and the second operational mode is a mode in which the power amplifier is electrically connected to the load component and disconnected from the antenna port; and
    wherein the switch is configured to connect the load component to the power amplifier according to the second operational mode when the power amplifier reaches a first predetermined power threshold.

2. The signal transmission system of claim 1, further comprising an antenna connected to the antenna port and configured to wirelessly transmit the amplified signal.

3. The signal transmission system of claim 1, wherein the signal is transmitted at a first frequency during a first transmission period and at a second frequency during a second transmission period, and wherein the power amplifier is further configured to modulate from the first frequency to the second frequency.

4. The signal transmission system of claim 3, wherein the switch connects the load component to the power amplifier during a first portion of the power amplifier modulation, and wherein the switch disconnects the load component from the power amplifier during a second portion of the power amplifier modulation.

5. The signal transmission system of claim 3, wherein the switch is configured to redirect the amplified signal to the load component during at least a portion of the power amplifier modulation.

6. The signal transmission system of claim 1, wherein the load component comprises a resistor, configured to receive at least a portion of the amplified signal.

7. The signal transmission system of claim 6, wherein the resistor has a resistance of about 50 Ohms.

8. The signal transmission system of claim 1, wherein the first operational mode directs the amplified signal to the antenna port.

9. The signal transmission system of claim 1, wherein the second operational mode directs the amplified signal to the load component.

10. The signal transmission system of claim 1, wherein the first predetermined power threshold is a percentage of power or a percentage of a channel modulation completed.

11. The signal transmission system of claim 1, wherein the switch is configured to disconnect the load component from the power amplifier according to the first operational mode when the power amplifier reaches a second predetermined power threshold.

12. The signal transmission system of claim 11, wherein the second predetermined power threshold is a percentage of power.

13. The signal transmission system of claim 11, wherein the second predetermined power threshold is a percentage of a channel modulation completed.

14. The signal transmission system of claim 1, wherein the power amplifier is configured to transition from a first transmission frequency to a second transmission frequency.

15. A method for signal transmission comprising:
- wirelessly transmitting a signal on a first channel;
- modulating a power amplifier for transmission on a second channel;
- in response to the power amplifier reaching a first predetermined power threshold, redirecting the signal from an antenna to a load component during a portion of the modulation.

16. The method for signal transmission of claim 15, wherein the redirection occurs by selectively disconnecting a power amplifier from an antenna and selectively connecting the power amplifier to the load component.

\* \* \* \* \*